US005497298A

United States Patent [19]

[11] Patent Number: 5,497,298

Luallin et al.

[45] Date of Patent: Mar. 5, 1996

[54] HEADLAMP ASSEMBLY WITH COIL SPRING BULB SHIELD

[75] Inventors: John M. Luallin; Jan A. Wisler; Joseph C. Ballman, all of Anderson; David B. Barnes, Carmel, all of Ind.

[73] Assignee: General Motors Corporation, Detroit, Mich.

[21] Appl. No.: 353,592

[22] Filed: Dec. 12, 1994

[51] Int. Cl.[6] .......... B60Q 1/02

[52] U.S. Cl. .......... 362/61; 362/343; 362/353; 362/440

[58] Field of Search .......... 362/61, 226, 298, 362/302–305, 343, 351, 353, 361, 390, 433, 440, 442, 444

[56] References Cited

U.S. PATENT DOCUMENTS

| | | | |
|---|---|---|---|
| 1,238,484 | 8/1917 | Benjamin | 362/309 |
| 1,245,083 | 10/1917 | Benjamin | 362/292 |
| 1,273,473 | 7/1918 | Finkelstein | 362/301 |
| 1,633,838 | 6/1927 | Zimmerman | 362/303 |
| 1,991,866 | 2/1935 | Rich | 362/80 |
| 2,556,328 | 6/1951 | Hinds | 362/309 |
| 3,833,955 | 9/1974 | Hulbert, Jr. | 362/61 |
| 4,636,923 | 1/1987 | Oyama et al. | 362/80 |
| 4,725,929 | 2/1988 | Huang | 362/80 |
| 4,760,500 | 7/1988 | Peng | 362/74 |
| 4,831,506 | 5/1989 | Miyazawa | 362/284 |
| 4,882,660 | 11/1989 | Liverance et al. | 362/226 |
| 5,067,054 | 11/1991 | Oshio et al. | 362/61 |
| 5,111,368 | 5/1992 | Suzuki et al. | 362/61 |
| 5,195,815 | 3/1993 | Watanabe et al. | 362/61 |
| 5,199,779 | 4/1993 | Sato | 362/61 |
| 5,260,856 | 11/1993 | Perthus et al. | 362/61 |
| 5,402,325 | 3/1995 | Wisler et al. | 362/61 |

*Primary Examiner*—Ira S. Lazarus
*Assistant Examiner*—Alan B. Cariaso
*Attorney, Agent, or Firm*—Ernest E. Helms

[57] ABSTRACT

A vehicle headlamp assembly is provided which includes a light bulb providing a source of illumination; a reflector housing with a central opening with a reflector surface for reflecting illumination given by the light bulb, the reflector housing central opening mounting the light bulb, the reflector housing having a first surface opposite the reflector surface adjacent the central opening and a second surface on the same side of the reflector surface generally adjacent the central opening; and a bulb shield having a first portion along a first end. The first portion is generally closely adjacent to the light bulb for blocking illumination provided by the light bulb. The bulb shield has at an end opposite the first end at least one foot penetrating through the central opening with a radially outwardly extending toe engaging the reflector housing first surface. The bulb shield also has a coil spring contacting the reflector second surface urging the first end of the bulb shield away from the first and second surfaces of the reflector housing.

7 Claims, 3 Drawing Sheets

HEADLAMP ASSEMBLY WITH COIL SPRING BULB SHIELD

FIELD OF THE INVENTION

The field of the present invention is that of vehicle headlamp assemblies, especially vehicle headlamp assemblies which utilize replaceable-type bulbs.

BACKGROUND OF THE INVENTION

Headlamps with aerodynamic styling provide for smaller replaceable halogen bulbs. This permits the lens and reflector housing to remain in place on the vehicle and only requires that the smaller halogen bulb be replaced, should a bulb burn out and require servicing. Replaceable-type bulbs often require a shield over them to prevent light that can cause glare by reflecting on certain surfaces of the reflector housing and then projecting into an unintended area. Each bulb shield acts as a lamp shade in a way, keeping the light away from some areas and controlling light to permit it to reflect outward in other areas. Each bulb shield is different, depending on the shape of the headlamp and subsequently the reflector housing.

Currently, bulb shields are attached to the bulb retainer and come in may different configurations, leading to a large number of components. Some headlamp assemblies require a different bulb mounting system and/or have different reflector optics which will not allow the bulb shield to be attached to a bulb retainer. Therefore, a new mounting system which permits the bulb shield to be attached independently is needed. It should also be noted that bulb shields which are mounted with screws to the reflector housing are not preferred and in some instances are considered to be totally unacceptable. One such bulb shield that allows for attachment to the reflector housing without the use of fasteners while providing for easy installation is shown and described in commonly assigned O'Shaughnessey et al U.S. Ser. No. 08/239,805, now U.S. Pat No. 5,386,348.

SUMMARY OF THE INVENTION

The present invention provides a vehicle headlamp assembly as an alternative to the aforementioned U.S. Ser. No. 08/239,805. In the present invention, the bulb shield may be fixably attached to the reflector housing without the use of fasteners, which allows easy yet very secure installation by axial translational insertion into a central opening provided in the reflector housing.

DESCRIPTION OF THE PREFERRED EMBODIMENT

Figure 1:
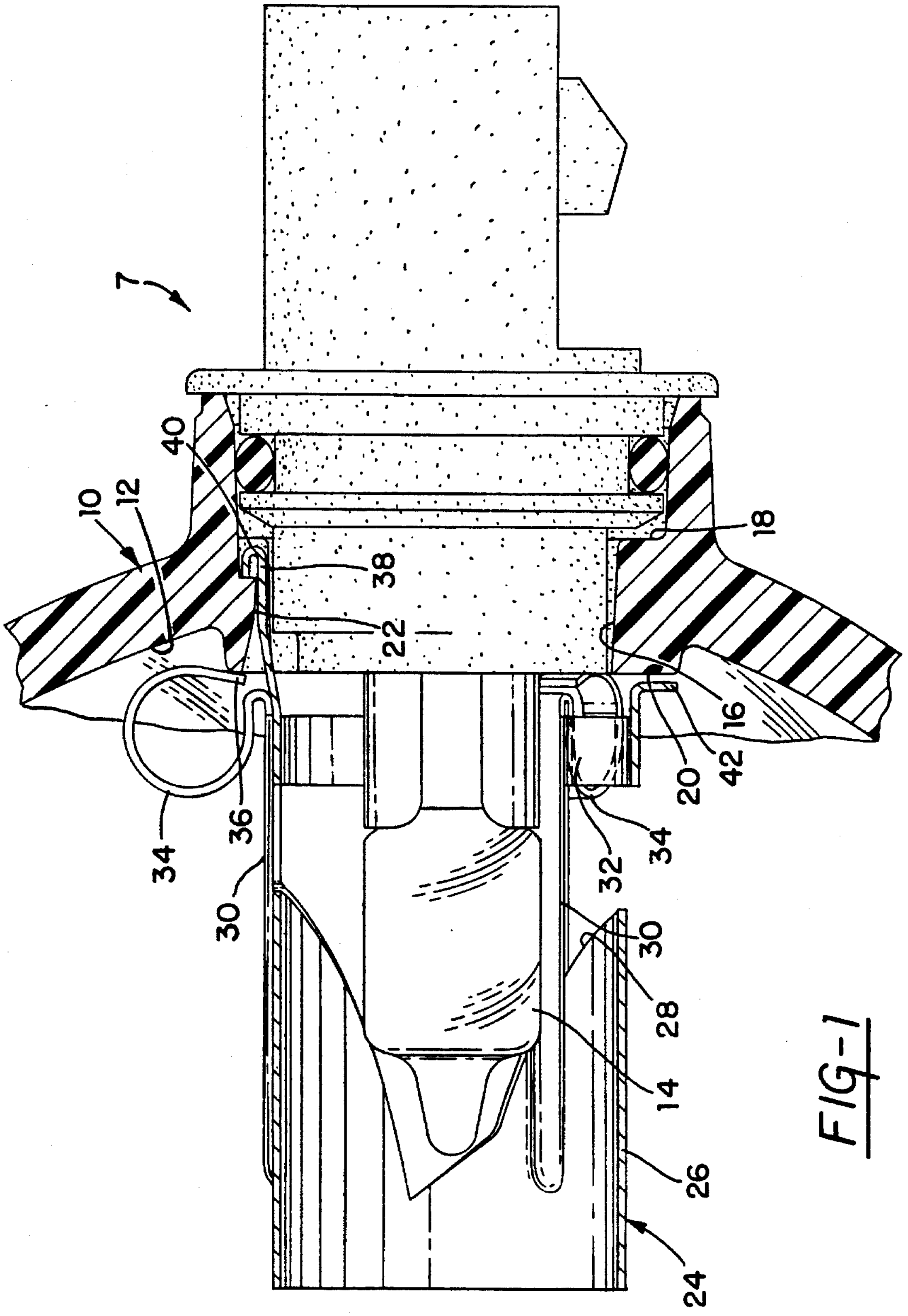
FIG. 1 is a sectional view with portions cut away of a preferred embodiment automotive vehicle headlamp assembly according to the present invention including a reflector housing, a light bulb and a bulb shield.
Figure 2:
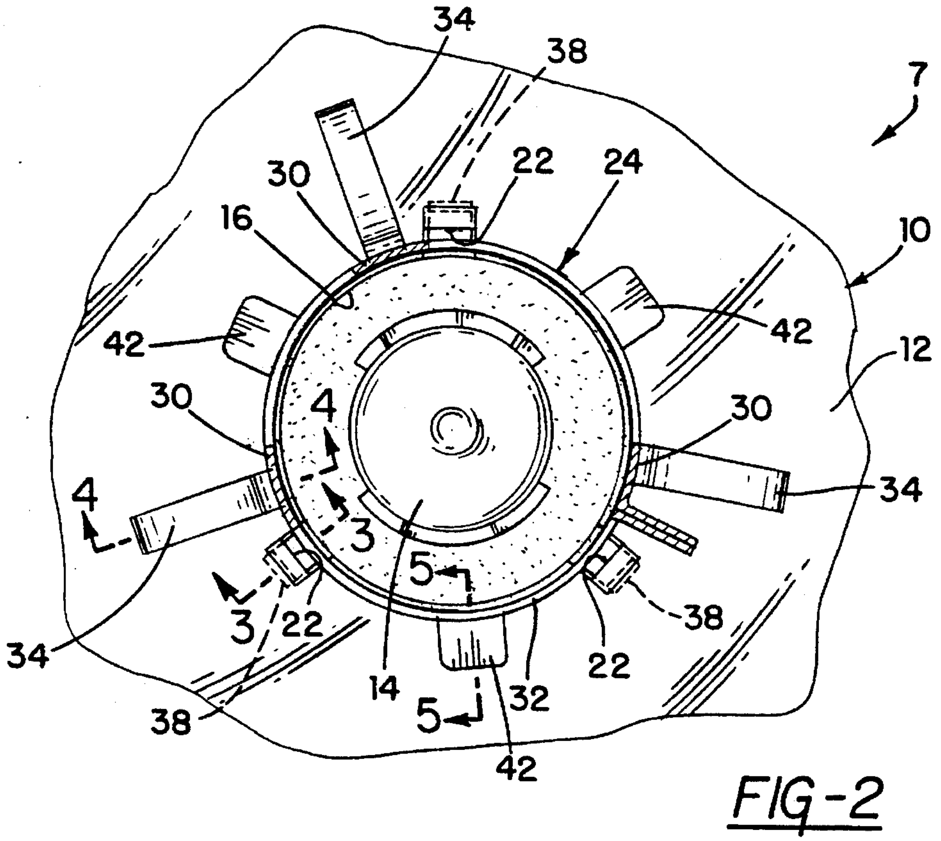
FIG. 2 is a view taken along line 2—2 of FIG. 1.
Figure 3:
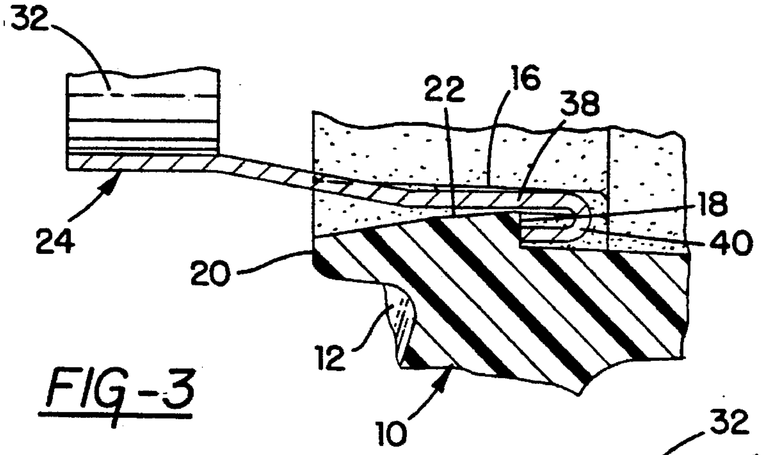
FIGS. 3, 4 and 5 are views taken along lines 3—3, 4—4 and 5—5, respectively, of FIG. 2.
Figure 4:
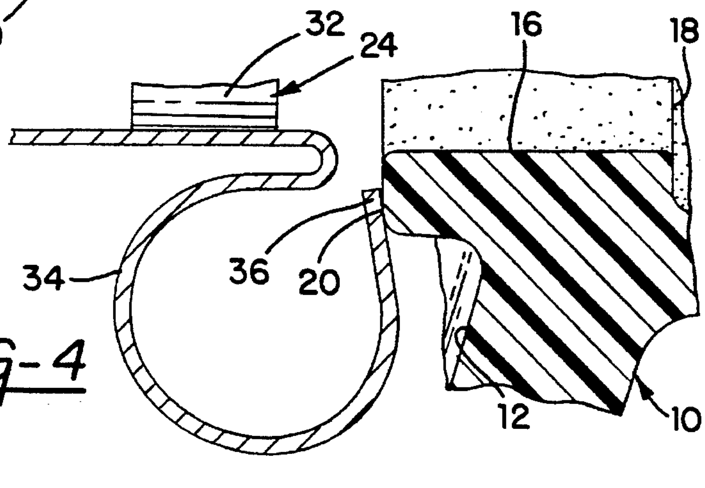
Figure 5:
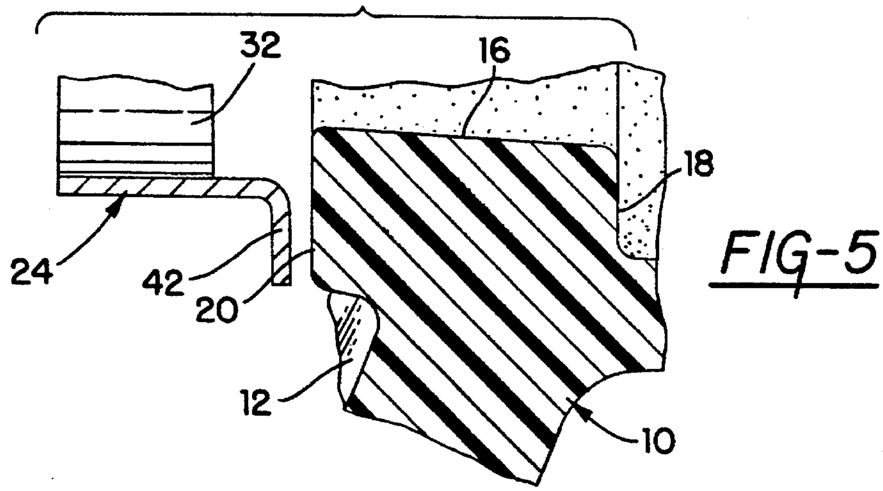
Figure 6:
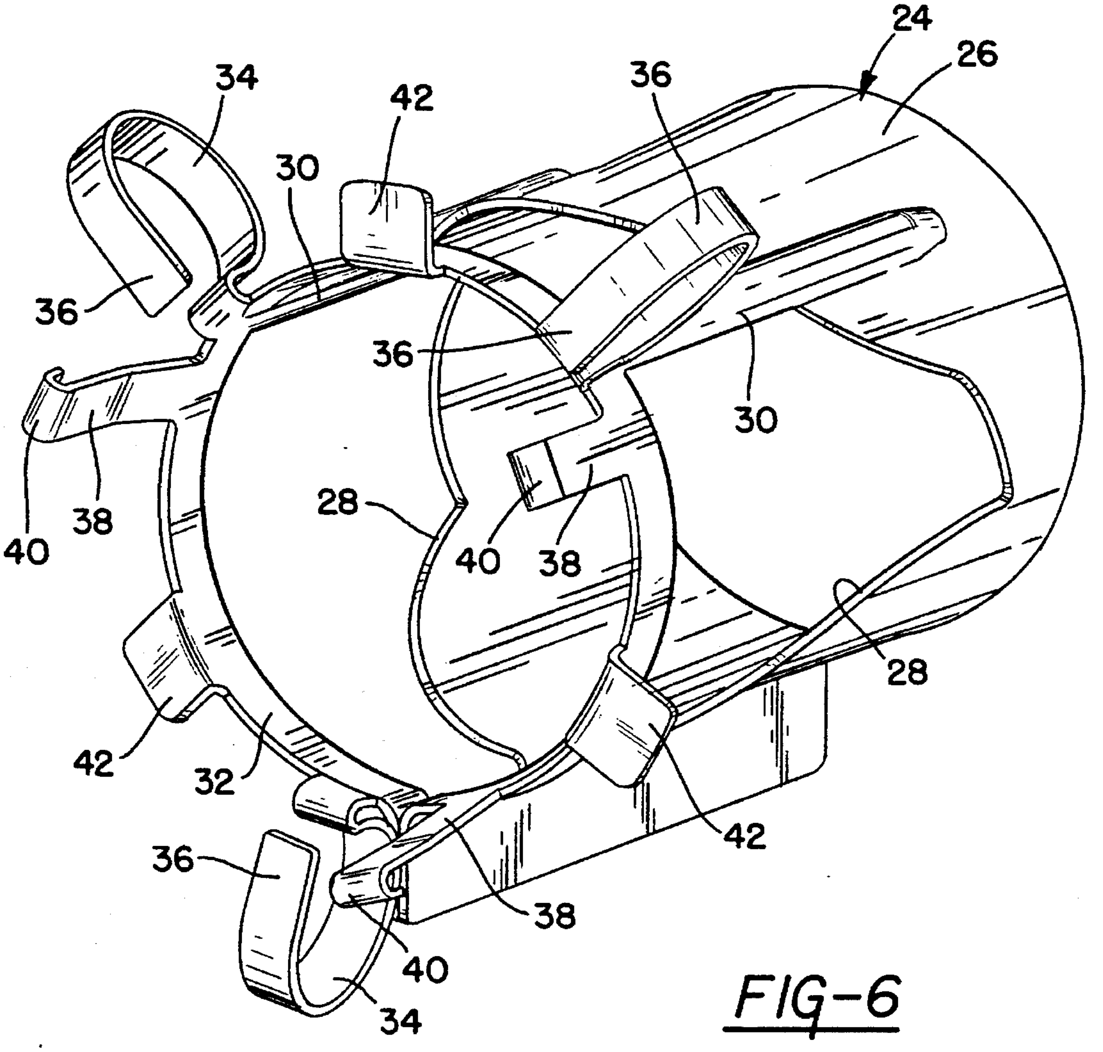
FIG. 6 is an enlarged perspective view of the bulb shield shown in FIGS. 1 through 5.

Referring to FIGS. 1 through 6, the automotive vehicle headlamp assembly 7 according to the present invention has a reflector housing 10. The reflector housing 10 is typically made from a moldable thermoset plastic and has a reflector surface 12 which reflects illumination given off by a light bulb 14. The reflector housing also has a central opening 16 which joins a rear first surface 18 with a forward facing second surface 20. The central opening 16 has three axial grooves 22 which, if so desired, can be geometrically spaced to insure that only a left or right bulb shield be able to be inserted therein in a manner to be described later.

The light bulb 14 provides a source of illumination for the headlamp assembly. To prevent light emanating from the light bulb from hitting a portion of the reflector housing (not shown in FIG. 1), which could possibly generate glare, there is provided a bulb shield 24. Bulb shield 24 has a generally tubular first end 26 generally closely adjacent to the light bulb 14 for blocking a portion of the light emanating therefrom. Portion 26 is bordered by a curved line portion 28, the exact geometric shape of which is developed from the usable deflector surface boundaries. The first portion 26 via a plurality of legs 30 is joined to a cylinder band 32. Band 32 has emanating therefrom three coil springs 34 with ends 36 which make contact with the second reflector surface 20 which is closely adjacent the central opening 16. Joined to the band 32 are three feet 38 geometrically spaced to align with the grooves 22. To insure the proper orientation of bulb shield 24 being utilized, left and right bulb shields will typically be configured to have feet pattern corresponding to the peculiar geometric spacing of each respective grooved central opening of the reflector housing. The feet 38 radially spring outwardly to engage with the central opening grooves 22. Each respective foot 38 has a hooked toe 40 which engages with the second surface 18.

To prevent over-insertion of the bulb shield 24 into the central opening 16 of the reflector housing, there are three radially extending knees 42 which are also connected with the band 32.

Due to the different solidification rates of different batches of plastic and tolerance buildup variations, it is sometimes difficult to accurately control the axial distance between a rear surface 18 and the second surface 20. The inventive bulb shield is allowed compensation by the springs 34, which urge the bulb shield in a direction causing the first portion of the bulb shield 26 to move away from the first and second housing surfaces. Therefore, regardless of slight variations in the distance between surfaces 18 and 20, the bulb shield will be securely affixed to the reflector housing 10 such that it will remain secure under conditions of vehicle vibration. The bulb shield 24 will be easily insertable in position by axially aligning the feet 38 with the grooves 22 and pushing inwardly, allowing the spring feet 38 to spring outwardly to locate the toes adjacent the second surfaces 18, thereby insuring a secure fit. The knees 42 provide a limit to prevent over-insertion. The bulb shield 24 can be made from a stamped steel approximately 0.5 mm thick.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A vehicle headlamp assembly comprising:

a light bulb providing a source of illumination;

a reflector housing with a central opening and with a reflector surface for reflecting illumination given by the light bulb, the reflector housing central opening mounting the light bulb, the reflector housing having a first surface opposite the reflector surface adjacent the central opening and a second surface on the same side of the reflector surface generally adjacent the central opening; and a bulb shield, having a first portion along a first end, the first portion being generally closely adjacent to the light bulb for blocking a portion of illumination provided by the light bulb, the bulb shield having at an end opposite the first end at least one foot penetrating through the central opening with a radially outwardly extending toe engaging the reflector housing first surface, and the bulb shield having a coil spring contacting the reflector second surface urging the first end of the bulb shield away from the first and second surfaces of the reflector housing.

2. A headlamp assembly as described in claim 1 wherein the bulb shield has at least another of the foot.

3. A headlamp assembly as described in claim 1 wherein the foot acts as a spring along the central opening urging radially outwardly.

4. A headlamp assembly as described in claim 1 wherein the foot fits in a slot in the central opening.

5. A headlamp assembly as described in claim 1 wherein the bulb shield can be installed with the reflector housing only from a side of the reflector housing adjacent to the reflector surface.

6. A headlamp assembly as described in claim 1 further including a knee projecting radially outwardly from the end of the bulb shield, limiting the projection of the foot into the central opening.

7. A vehicle headlamp assembly comprising:

a light bulb providing a source of illumination;

a reflector housing with a central opening and with a reflector surface for reflecting illumination given by the light bulb, the reflector housing central opening mounting the light bulb, and the reflector housing central opening having a series of grooves, the reflector housing also having a first surface opposite the reflector surface adjacent the central opening and a second surface on the same side of the reflector surface generally adjacent the central opening; and a bulb shield, the bulb shield having a first tubular end generally closely adjacent to the light bulb for blocking a portion of illumination provided by the light bulb, the bulb shield having at an end opposite the first end a plurality of feet radially springing outwardly within the grooves of the central opening, each of the feet having a hooked toe engaging the reflector surface, and the bulb shield having a plurality of coiled springs contacting the reflector second surface, urging the first portion of the bulb shield away from the first and second surfaces of the reflector housing, and the bulb shield having radially projecting knees limiting the insertion of the feet within the central opening.

* * * * *